United States Patent [19]

Leyde

[11] 4,034,233

[45] July 5, 1977

[54] POWER MONITORING AND REGULATING CIRCUIT AND METHOD HAVING AN ANALOG INPUT REPRESENTING POWER RATE AND A DIGITAL OUTPUT FOR CONTROLLING THE ON/OFF STATES OF A PLURALITY OF LOADS

[75] Inventor: Warren L. Leyde, Seattle, Wash.

[73] Assignee: Pacific Technology, Renton, Wash.

[22] Filed: July 22, 1976

[21] Appl. No.: 707,566

[52] U.S. Cl. .......................... 307/41; 235/151.21; 324/103 R

[51] Int. Cl.$^2$ ......................................... H02J 3/00

[58] Field of Search ............... 307/62, 41, 39, 86, 307/17, 38, 52, 85, 55, 35, 59, 60; 235/151.21; 324/103 R, 103 P

[56] References Cited

UNITED STATES PATENTS

| | | | |
|---|---|---|---|
| 3,339,079 | 8/1967 | Kessler | 307/29 |
| 3,566,147 | 2/1971 | Masreliez | 307/41 |

Primary Examiner—James R. Scott
Assistant Examiner—Morris Ginsburg
Attorney, Agent, or Firm—Christensen, O'Connor, Garrison & Havelka

[57] ABSTRACT

In a closed loop control system for monitoring and regulating the rate of electrical power delivered to a plurality of electrical loads, an improved circuit is disclosed that is responsive to an analog input signal representing a measured power rate and has a digital pulse output for conditioning a digital switching circuit to add one or more loads when the measured power rate falls below a predetermined rate and to shed one or more loads when the measured power rate exceeds such predetermined rate. The analog input signal is compared with a reference signal to produce an analog error signal that is first compensated for certain types of power rate deviations and is then fed to an analog to digital conversion circuit which includes a threshold detection circuit and a pulse generator circuit and produces one or more output pulses in response to a predetermined threshold magnitude of the compensated error signal. The polarity of the error signal is detected to steer the output pulses to one or the other of a pair of inputs of a load control switching circuit, one input thereof being effective to add a load and the other input being effective to shed a load in response to each received pulse.

9 Claims, 4 Drawing Figures

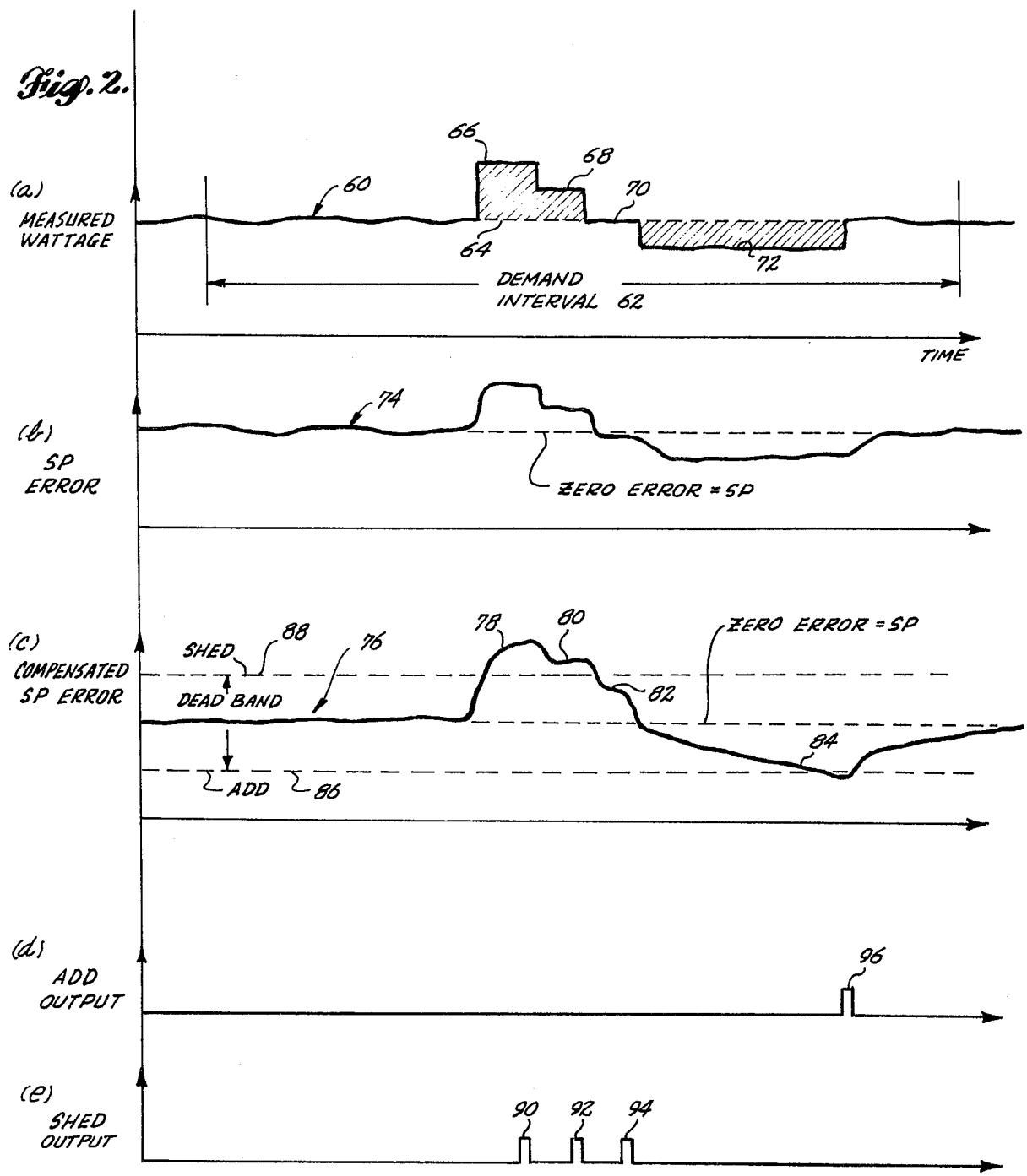

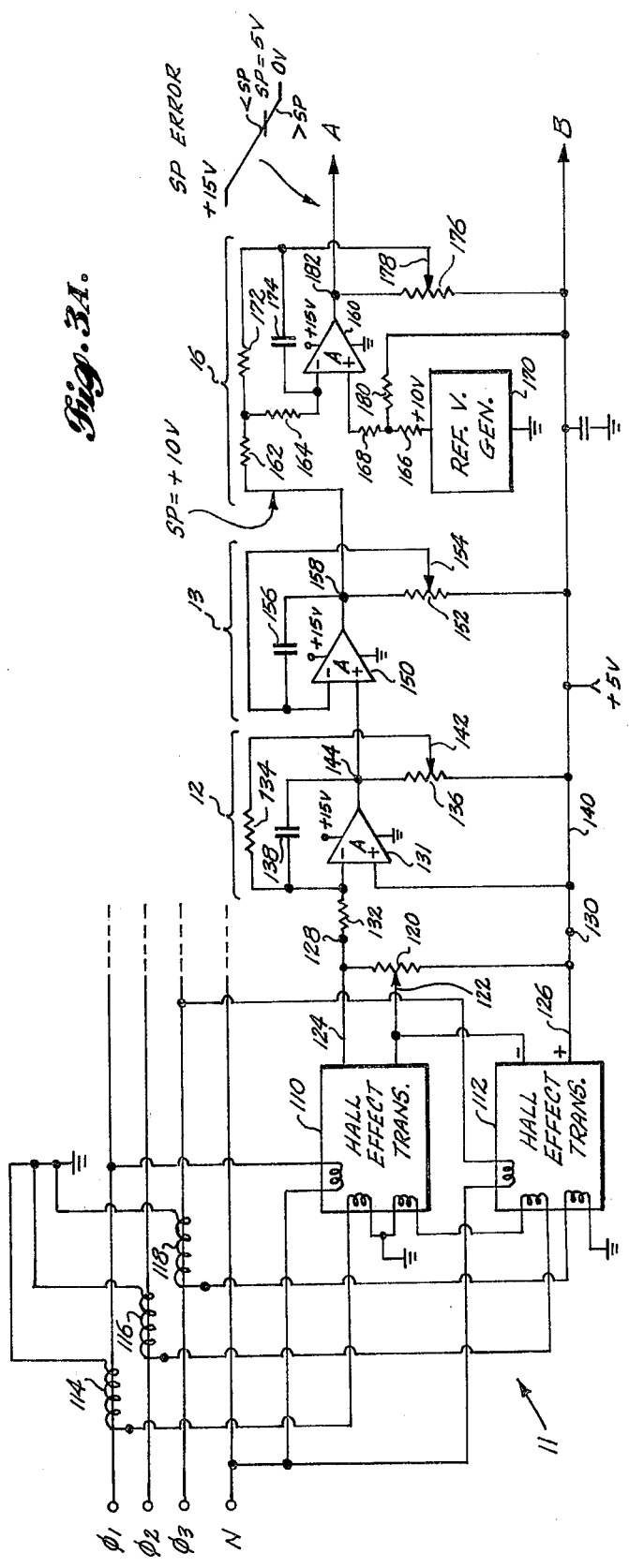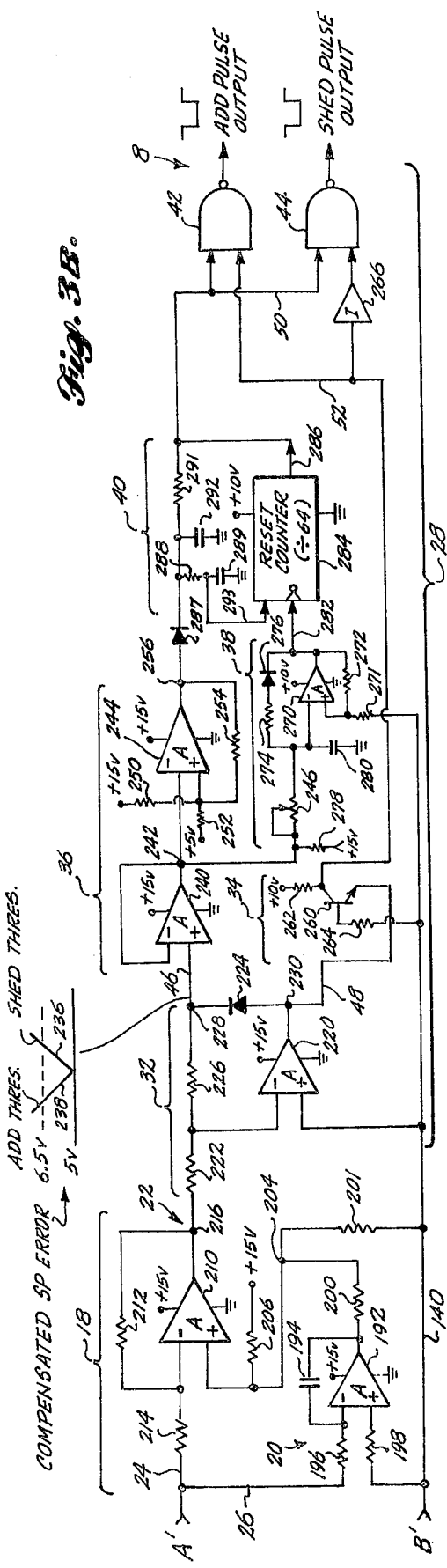

POWER MONITORING AND REGULATING CIRCUIT AND METHOD HAVING AN ANALOG INPUT REPRESENTING POWER RATE AND A DIGITAL OUTPUT FOR CONTROLLING THE ON/OFF STATES OF A PLURALITY OF LOADS

BACKGROUND

The present invention relates to electrical load control systems in which the rate of power delivered to a plurality of loads is continuously measured and compared with a predetermined desired rate of consumption. If the monitored rate exceeds the desired rate, then one or more of the loads are disconnected (shed) and if the converse exists, then one or more of the loads are connected (added) to bring the rate of consumption of power up to the desired level.

Systems incorporating the principles of the present invention, as more fully described herein, can be adapted for a wide variety of applications. However, the invention is primarily intended for use in power monitoring and regulating systems designed for regulating electrical power consumption by utility customers. The efficiency for a utility depends to a large extent on the uniformity and predictability of the level of power required to meet the demands of the numerous utility users. In order to improve such efficiency, the utilities have adopted certain billing practices designed to encourage customers to even out their power consumption and to avoid temporary overloads that are incapable of being efficiently met by the power resources available at the utility's central station. One practice is to charge the customer according to a usage formula that includes a factor based on the actual energy consumed over a period of time, such as a month, and a factor based upon the maximum power consumption in one of a succession of short time intervals, referred to as the demand intervals. Typically each demand interval in 15, 30 or 60 minutes.

Utility meters such as the integrated-demand meter, have been developed for installation at the power entry point of the customers facility for measuring total energy consumed during a predetermined billing period, e.g. one month, and the maximum energy used during any one of the demand intervals. The billing rates based on the above-mentioned formula are applied so that the customer pays a disproportionately higher amount when he allows an overload condition to occur in any one of the demand intervals during the billing period. In other words, the customer pays less if he is able to regulate his loads so that he limits the maximum energy consumed during the brief demand interval, and instead, spreads the equivalent amount of energy out over a plurality of demand intervals. Existing power monitoring and regulating systems are installed to provide load regulation so as to avoid a large, temporary overload that might otherwise occur during any one of the relatively short demand intervals.

For large industrial customers, the utilities generally install a utility meter of the type that produces metering pulses representing the time lapse of each demand interval and representing the rate of power usage occurring within such interval. The utility itself has equipment for automatically counting metering pulses and uses the totals therefrom to calculate the customer's bill. For such installations, power monitoring and regulating systems are available to receive and process the metering pulses and to develop appropriate electrical control functions therefrom for regulating the number of loads connected to the power source. The regulation takes the form of adding loads when the rate of power is too low and shedding loads when the power consumption becomes excessive.

However, many utility customers, especially smaller, non-industrial businesses, are not equipped with a pulse-output type of demand meter. Instead, a type of less costly, demand meter is typically installed in which an electro-mechanical ratchet mechanism operates to register the maximum energy used during any one of the demand intervals occurring between monthly meter readings. Existing power monitoring and limiting systems of the type that receive electrical metering pulses, are not suited for customers having this type of meter installation.

Accordingly, one of the objects of the present invention is to provide an improved circuit and method for monitoring and regulating power consumption for use in installations where a pulse-type demand meter is not available.

More particularly it is an object of the present invention to monitor the rate of power consumption by means of an analog-type circuit and to convert the analog measurement into a digital-type output suitable for controlling the adding and shedding of electrical loads.

Another object of the present invention is to provide a circuit of the above-described type having the capability of regulating the loads so that an overload condition, if it does occur, can be corrected quickly enough so that it does not register on the demand meter as an excessive energy demand during the applicable demand interval.

SUMMARY

Briefly, the principles of the present invention are embodied in a circuit and method for measuring the rate of electrical power delivered to the customer's electrical fixtures and equipment and producing an analog signal representing the actual rate of such power. The analog rate signal is compared with a reference signal representing a desired rate, and when the actual power rate exceeds or falls short of the desired rate, the circuit functions to produce digital output signals, such as pulses, for effecting load control. The control pulses thus generated may be in the form of one or more shed pulses that direct a load control switching circuit to shed a load for each shed pulse, where the number of shed pulses is in proportion to the amount by which the measured power exceeds the desired rate. Similarly, when the measured power falls short of the desired rate, one or more add pulses are produced, each such pulse directing a load control switching circuit to add one load.

In the preferred embodiment of the circuit, an analog error signal is produced as a result of the comparison of the analog power rate signal and the reference signal. The error signal is processed by an error integrating circuit that integrates the signal and sums the integral thereof with the instantaneous value of the error signal to produce a compensated error signal that is effective to compensate for temporary overload conditions by causing the circuit to over-shed, i.e. shed more than enough loads to reduce the error to zero, thereby producing a temporary undershoot of the reference rate so that the energy consumed during any given demand interval is maintained within acceptable bounds.

To convert the compensated error signal into appropriate add and shed control pulses, the preferred circuitry includes an absolute value circuit, an error polarity detection circuit, a threshold detection circuit, and a digital switching circuit. These circuits cofunction to detect a threshold deviation of the compensated error signal, the amount by which such error signal exceeds the threshold, and the polarity of such error signal. An output gate in the switching circuit issues one or more add pulses when the polarity of the compensated error signal indicates that the measured power is less than the reference rate and that the magnitude of such error signal exceeds the threshold. The number of add pulses thus produced depends upon the amount by which the compensated error signal exceeds the threshold. Similarly, one or more shed control pulses are produced when the polarity of the compensated error signal indicates that the measured power lies above the reference rate and that the threshold has been exceeded.

These and further features, objects and advantages of the invention will become apparent to those skilled in the art from the following detailed description and appended drawings.

BRIEF DESCRIPTION OF THE DRAWINGS

FIG. 2 is a plurality of graphs depicting a family of wave-forms all drawn to the same horizontal time scale and showing various signals occurring at different points within the circuit of FIG. 1.

FIGS. 3A and 3B together are a detailed block and schematic diagram of the principal portion of the circuit shown in FIG. 1.

DESCRIPTION OF THE PREFERRED EMBODIMENT

Figure 1:
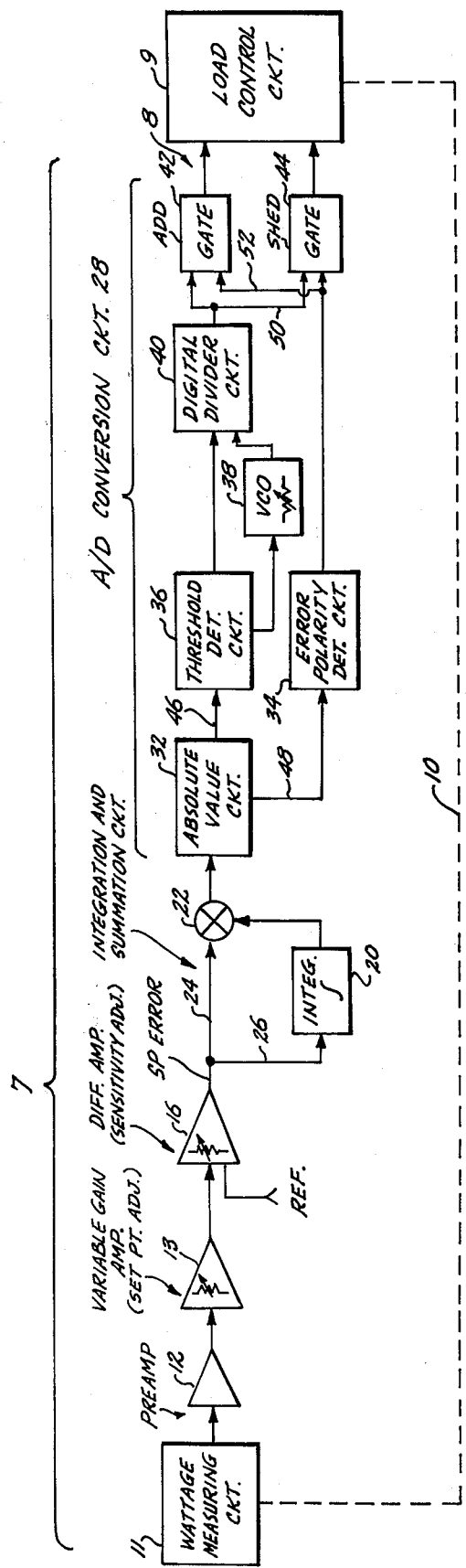
FIG. 1 is a simplified block diagram of a power monitoring and load regulating circuit embodying the principles of the present invention.

Although circuits and methods embodying the present invention can be adapted for a wide variety of applications, the primary use of the invention is for regulating power consumption in smaller commercial and industrial installations in which the utility measures the power use by meters other than the pulse-type meter. Usually, such customers include hotels, motels, smaller retail stores, restaurants, etc. and the meters installed at these facilities are usually a demand-meter having an electro-mechanical energy measuring device of the type described above.

SIMPLIFIED BLOCK DIAGRAM AND PRINCIPLES OF OPERATION

With reference to FIG. 1, a circuit 7, embodying the principles of the invention is shown to have an analog input, provided by a wattage measuring circuit 11, and a digital output 8. Circuit 7 is connected to form part of a closed loop system for monitoring and regulating power delivered by a power source by measuring wattage with circuit 11 and responsively controlling the power rate by means of a load control circuit 9 connected to receive digital control signals at output 8. The loop is closed by a feedback path 10, representing the power distributing lines that supply power to the controlled loads from the power source. Wattage measuring circuit 11 is adapted for connection to the power source, such as the customer's service, at any suitable location upstream of the point at which the service is distributed to the loads that are to be regulated. The output of circuit 11 is an analog voltage signal representing the rate that power is being consumed by the particular type and number of loads connected to the power source at any given instant.

A pre-amplifier 12, amplifies the signal from circuit 11 and feeds it forward to an amplifier 13, the gain of which is adjustable, to permit a normalizing adjustment to be made in the overall signal gain between circuit 11 and the output of circuit 13. This normalizing adjustment enables the user to set a desired wattage level, referred to herein as the set point (SP), that the system will seek to attain by regulating the number of loads connected to the power source.

The output signal from amplifier 13, is connected to one input of a differential amplifier 16 for being compared with a fixed reference voltage signal that is applied to the other input of amplifier 16. The magnitude of the reference signal is such that it equals the output from amplifier 13 when the power measured by circuit 11 is at the SP wattage selected by the adjustment of the gain of amplifier 13. When the measured power deviates from the SP wattage, then amplifier 16 compares the changed voltage output of amplifier 13 with the reference signal and produces an SP error signal.

The gain of differential amplifier 16 is also adjustable. As more fully described herein, this latter adjustability enables the circuit to be adjusted to a desired sensitivity so that a load-corrective action at output 8 of circuit 7 is more (or less) sensitive to deviations of the measured wattage relative to the SP wattage.

From the output of amplifier 16, the SP error signal is processed by an integration and summation circuit 18 that includes an integrator 20 and a summing amplifier represented here as a summing junction 22. The SP error signal is fed in parallel via connections 24 and 26 to one input of summing junction 22 and to integrator 20, respectively. The integrated SP error signal from integrator 20 is connected to the other input of summing junction 22 such that the output of junction 22 produces an analog signal (referred to herein as the compensated SP error signal) equaling the summed values of the instantaneous SP error signal directly from the output of amplifier 16 and a time integrated function of such SP error signal. The purpose of this signal processing as described more fully herein, is to alter the SP error signal so that in the event of a brief overload condition, the loads are regulated so that the temporary overage in the wattage rate does not register on the utility meter as an increase in the maximum energy demand for the applicable demand interval. The converse situation, in which a brief underload occurs initially, produces an analogous overload correction of temporary duration.

After the processing of the SP error signal by circuit 18, the compensated SP error signal is fed to an analog to digital conversion circuit 28 that converts it into one or more, time-delayed, add or shed control pulses for commanding load control circuit 9 to add or shed an appropriate number of individual loads. More particularly, circuit 28 includes an absolute value circuit 32 having two outputs one of which is connected to an error polarity detection circuit 34 and the other of which is connected through a threshold detection circuit 36 to an adjustable voltage controlled oscillator (VCO) 38, and a digital divider circuit 40 which is responsive to circuit 36 and VCO 38 and a pair of logic gates 42 and 44, which, respectively, produce add and shed control pulses at output 8.

The function of absolute value circuit 32 is two-fold. A first output 46 from circuit 32 consists of an analog voltage signal that has a magnitude directly proportional to the magnitude of the compensated SP error signal applied at the input of circut 32, and has a constant polarity irrespective of the polarity of the input signal. A second output 48 from circuit 32 consists of a polarity determining signal that conditions a circuit 34 to selectively enable one of the pair of output gates 42 and 44 depending on the direction (polarity) in which the error occurs.

Threshold detection circuit 36 is responsive to the analog signal at output 46 of circuit 32. When the magnitude of such signal exceeds a predetermined threshold established by circuit 36 as described herein, then circuit 36 acts to operate VCO 38 and divider circuit 40 to cause the production of one or more successive output pulses at an output of divider circuit 40. The output pulses are applied over parallel connection 50 to one input each of gates 42 and 44. The remaining inputs of gates 42 and 44 receive a steering signal from circuit 34 over parallel connection 52 so that the pulse output from divider circuit 40 is steered either through add gate 42 or shed gate 44 depending upon the polarity of the compensated SP error signal. If the magnitude and polarity of the compensated SP error signal indicate a rate of power consumption in excess of the SP rate, then gate 44 is conditioned by circuit 34 to issue one or more shed pulses instructing load control circuit 9 to shed a corresponding number of loads. Similarly, if the magnitude and polarity of the compensated SP error signal indicate a power rate that falls short of a desired SP rate, then gate 42 is conditioned to issue one or more add pulses instructing circuit 9 to add a corresponding number of loads.

Load control circuit 9 represented in FIG. 1 by a simplified diagramatic block, can be any one of a variety of known switching circuits of the type having a plurality of outputs each adapted to control an individual load (usually via a load relay) and having two inputs for receiving add and shed control pulses, respectively. One of the inputs is connected to the output of add gate 42 and is responsive to each add control pulse received therefrom to switch one of the outputs of circuit 9 to turn "on" an associated load, thereby adding one load to the system. Similarly, the other input of circuit 9 is connected and responsive to each shed control pulse at the output of shed gate 44 to switch one of the outputs of circuit 9 to turn "off" the associated load, thereby shedding a load. For example, one simple embodiment of circuit 9 is an up/down digital counter having a plurality of outputs for controlling load relays in which an up input is respective of pulses from add gate 42 and a down input is receptive of pulses from shed gate 44. Another example of a suitable embodiment of load control circuit 9 is found in the digital control section of the Model Series 360 load controllers manufactured by and available from Pacific Technology Incorporated of Seattle, Washington, where the circuitry therein is an improvement over existing load control circuitry and is the subject matter of a copending application for U.S. Patent entitled DIGITAL LOAD CONTROL CIRCUIT AND METHOD FOR POWER MONITORING AND LIMITING SYSTEM, Ser. No. 707,564, filed July 22, 1976, by the inventor herein, and the disclosure in such copending application is expressly incorporated herein by reference.

The wave forms depicted in graphs $(a)$–$(e)$ of FIG. 2 illustrate typical signal patterns occurring in circuit 7 of FIG. 1 as it responds to a varying rate of power consumption. Graph $(a)$ of FIG. 2 shows a waveform 60 representing an analog voltage signal at the output of wattage measuring circuit 11 which has a varying amplitude (vertical axis) as a function of time (horizontal axis). For the purposes of illustration, the time frame of a utility demand interval 62 has been superimposed on the waveform 60. During demand interval 62, a utility meter operates concurrently with circuit 7 of FIG. 1 to measure and register the total energy consumed by the customer's electrical installation, where the measurement is usually in terms of watt-hours or kilowatt-hours. The same meter measurement is performed for each successive demand interval and a ratchet-driven indicator registers the highest level of energy used during any one prior demand interval since the last meter reading, at which time the indicator was reset. During the initial portion of demand interval 62, the measured wattage is shown to remain fairly uniform, deviating only slightly from a nominal rate represented by dotted line 64. After some time lapse, the wattage increases abruptly to a rate indicated at 66 whereupon the regulating action of circuit 7 of FIG. 1 operates to instruct load control circuit 9 to shed loads, such shedding being achieved at time delayed intervals that appear in graph $(a)$ of FIG. 2 as step decreases in the measured wattage. Successive reductions in wattage appear at levels 68, 70 and 72. It is observed that the wattage rate at level 72 is less than the nominal rate at level 64, thereby exhibiting an undershoot of the desired rate, the purpose of which is described more fully herein. After being operated at the undershoot level 72 for a suitable duration, the system is brought back to the nominal level 64 by conditioning load control circuit 9 to add a load.

Graph $(b)$ of FIG. 2 depicts another waveform 74 that appears at the output of differential amplifier 16 of FIG. 1 and represents the SP error signal resulting from a differential comparison of the measured wattage and a fixed reference signal. As can be seen, waveform 74 remains fairly steady until the step increase in wattage waveform 60 shown in graph $(a)$ occurs, whereupon the SP error signal correspondingly deviates from the nominal value and waveform 74 thereupon traces out the profile of waveform 60.

Graph $(c)$ of FIG. 2 shows a waveform 76 representing the compensated SP error signal at the output of integration and summation circuit 18. By comparing waveform 76 with the waveform 74 in graph $(b)$, it will be seen that the compensated SP error signal is a signal of irregular shape resulting from the summation of the SP error signal represented by waveform 74 and the time integral of such signal. Accordingly, for waveform 76, segments 78 and 80, corresponding to levels 66 and 68 of waveform 60, increase in magnitude with increasing time because of the addition of the integral component that is growing larger with time. Segments 82 and 84 of wave form 76 on the other hand are shown to decrease with time reflecting the decrease in the integral component with time since segments 82 and 84 are produced after the SP error signal as shown in graph $(b)$ has fallen below the SP level.

Superimposed on the waveform 76 of graph $(c)$ of FIG. 2 are the add and shed threshold limits, indicated by dotted lines 86 and 88 respectively, set by threshold detection circuit 36 of FIG. 1. Between limits 86 and 88 a dead band is established and so long as the compensated SP error voltage of waveform 76 remains within this dead band, no corrective add or shed output from gates 42 and 44 occurs. However, if waveform 76 increases in magnitude, above the shed limit 88, as occurs in this example at segments 78 and 80, then the threshold detection circuit 36 of circuit 28 operates to issue one or more shed pulses from gate 44 to shed a corresponding number of loads. Similarly, if the magnitude of waveform 76 drops below add limit 86, then an appropriate number of add pulses are produced at the output of gate 42 to add a corresponding number of loads.

The width of the dead band between limits 86 and 86 is adjustable by changing the sensitivity (gain) of amplifier 16 so that greater or lesser fluctuation of the measured wattage is permitted before the add/shed limits are reached.

The waveforms shown in FIG. 2 illustrate how integration and summation circuit 18 operates to correct for a temporary overload condition which might otherwise register on the utility meter as an excessive energy demand during interval 62. As illustrated, waveform 76 with the added integral component, increases the magnitude of the SP error signal and holds it above the shed limit 88 for a longer duration than would occur if the uncompensated SP error signal from the output of amplifier 16 was fed directly to threshold circuit 36. The compensated SP error signal with the integral component thus produces a greater number of shed pulses than would otherwise occur and causes the load control circuit 9 to shed an excess number of loads which results in the undershoot represented by a level 72 of waveform 60 in graph (a).

In this particular instance, a succession of three shed pulses 90, 92 and 94 are produced as depicted in graph (e) the time spacing of which is determined by the magnitude of the error in excess of the shed threshold. So long as the wattage remains at level 72 in graph (a), the system is operating in an undershoot mode in which the rate of power consumption falls short of the SP rate. This condition continues until the compensated SP error signal represented by the decreasing level 84 of waveform 76 reaches add limit 86, whereupon threshold circuit 36 causes an add pulse 96 shown in graph (d) of FIG. 2 to instruct circuit 9 to add a load to bring the wattage rate back up to the SP level.

The amount of energy reduction during the demand interval 62 resulting from the corrective undershoot is substantially equal to the amount of excessive energy used during the temporary overload condition that precipitated the correction. This is demonstrated by comparing the cross hatched areas in graph (a) of FIG. 2, that lie above and below, respectively, the nominal wattage level 64. Since these areas are substantially equal, it will be recognized that the integral of the waveform 60, which integral represents the total energy consumed during demand interval 62, will be substantially equal to the integral of an unvarying wattage level 64 over interval 62. Since the utility meter measures total energy consumed during the demand interval, the power overload condition, when compensated for in this manner, will not appear in a higher energy demand bracket. Occasionally, the corrective undershoot will not occur within the same demand interval and the desired result is not obtained. However, this is an infrequent occurrence.

DESCRIPTION OF DETAILED CIRCUIT (FIGS. 3A-3B)

The principles of the present invention represented by the simplified block diagram in FIG. 1 may be embodied by the more detailed block and schematic diagram of FIGS. 3A and 3B, which form circuit 7 when connected together as indicated by the complemental pairs of terminals A-A' and B-B'.

Circuit 11 is in this embodiment a true power measuring circuit using a pair of hall effect transducers 110 and 112 and three current transformers 114, 116 and 117 connected in a known manner to a three-phase four wire service as indicated by the wires designated $\phi_1$, $\phi_2$, $\phi_3$ and N. The particular components and connections shown in FIG. 3a for circuit 11, do not per se constitute part of the present invention. They are arranged in accordance with one of the recommended power measurement circuits disclosed in specification No. 60845 for the PX-2000 and 4000 Series Industrial Watt Transducers manufactured and available from Bell, Inc., of Columbus, Ohio. Together, transducers 110 and 112 produce a voltage output signal that is applied across the ends of a potentiometer 120 via connections 124 and 126 and represents, in analog form, the true power flowing in lines $\phi_1$, $\phi_2$ and $\phi_3$. A wiper arm 122 of potentiometer 120 is also connected to transducers 110 and 112 to form a balancing circuit in which arm 122 can be varied to balance the individual outputs of the two transducers 110 and 112. The balanced output signal is applied to terminals 128 and 130 which may be considered input terminals to the signal processing portion of circuit 7.

A relatively low amplitude voltage signal at terminals 128 and 130, e.g. between 0 and −100 millivolts, is applied to an input of preamplifier 12 which includes an operational amplifier 131, an input resistor 132 connected to the inverting input of amplifier 131, a feedback and output resistive-capacitative network including resistor 134, potentiometer 136, and a filtering capacitor 138. Capacitor 138 is connected between an output terminal 144 and the inverting input of amplifier 131 and has a value selected to smooth out the ripple that appears on the raw wattage measurement signal from circuit 11. The ends of potentiometer 136 are connected between the output of amplifier 131 and voltage reference line 140, while a wiper arm 142 of potentiometer 136 is connected through feedback resistor 134 to the inverting input of amplifier 131. The input signal applied at terminals 128 and 130 is of negative polarity which is inverted by amplifier 131 to appear as a positive voltage analog signal at output terminal 144. Wiper arm 142 permits the gain of preamplifier 12 to be adjusted so that the amplitude of the signal at junction 144 can be calibrated with respect to a known power rate in lines $\phi_1$, $\phi_2$ and $\phi_3$.

Variable gain amplifier 13 includes an operational amplifier 150, a potentiometer 152 connected between the output of amplifier 150 and reference line 140 and having a wiper arm 154 connected to the inverting input of amplifier 150 and forming, together with filter capacitor 156, an adjustable feedback network. The non-inverting input of amplifier 150 is connected to junction 144 to receive the output of pre-amplifier 12.

Potentiometer 152 of amplifier 13 permits the user to adjust the operation of the circuit for a desired SP power rate, wherein the adjustability of the rate is achieved by varying wiper arm 154 to achieve a selected percentage of the total available gain of amplifier 13. More particularly, the gain is adjusted so that when the desired SP rate is flowing through lines $\phi_1$, $\phi_2$ and $\phi_3$, a certain output voltage level appears at junction 158, called the normalized voltage level. At this level the closed loop system of FIG. 1 is in a state of equilibrium with gates 42 and 44 quiescent, producing no add or shed pulses. In this particular embodiment, with amplifier adjusted to 100% gain the normalized voltage level is reached when the wattage on lines $\phi_1$, $\phi_2$ and $\phi_3$ equals 2 kilowatts (SP = 2 kilowatts). In this instance, the normalized voltage level at junction 158 is equal to a +10 volts relative to ground and a +5 volts relative to a +5 volt reference voltage applied to line 140. Should the wattage on lines $\phi_1$, $\phi_2$ and $\phi_3$ deviate from the 2 kilowatt SP level, then the voltage signal at junction 158 will vary correspondingly from the +10 volt normalized level.

To change the SP, for example to 50% of the fuel scale level of 2 kilowatts, wiper arm 154 of potentiometer 152 is adjusted to select 50% of the full-scale rate of 2 kilowatts, thereby producing the normalized +10 volt signal at junction 158 when the wattage on lines $\phi_1$, $\phi_2$ and $\phi_3$ equals 1 kilowatt.

Differential amplifier 16 includes an operational amplifier 160 having its inputs connected to balanced resistive input networks, a first of which includes a set of resistors 162 and 164 connected to receive the signal from junction 158 of amplifier 13, and a second set of resistors 166 and 168 connected to a reference voltage generator 170 having a regulated +10 volt output with respect to ground. The set of input resistors 162 and 164 are connected to the inverting input of amplifier 160 and are associated with a feedback network including a resistor 172, a filter capacitor 174 and a potentiometer 176 having a wiper arm 178 connected jointly to capacitor 174 and resistor 172. The balanced resistive network for the non-inverting input side of the amplifier is completed by a resistor 180 connected between the junction of resistors 166 and 168 and reference line 140.

When the voltage signal at junction 158 equals the SP, in this instance +10 volts, both inputs to amplifier 160 are equal and the difference or error output at junction 182 of amplifier 160 is zero with respect to the reference line 140 and is equal to +5 volts with respect to ground. Since the signal representing measured power rate is applied to the inverting input of amplifier 160, the SP error signal at the output of the amplifier at junction 182 decreases in value for an increasing wattage and increases in value for a decreasing wattage. This operation is diagrammatically illustrated by the waveform sketch shown adjacent the output of amplifier 160 in which an output voltage that is greater than +5 volts with respect to ground represents a measured wattage less than the SP, and a voltage that falls below +5 volts with respect to ground represents a measured wattage that is greater than the SP. In this particular embodiment, the SP error voltage is shown to have a range between +15 volts and zero volts.

Integration and summation circuit 18 includes an integrator 20 that is here formed of an operational amplifier 192, a capacitor 194 connected in feedback about the inverting side of amplifier 192, an input resistor 196 connected between the inverting side of the amplifier and connection 26 for receiving the SP error signal from differential amplifier 16, another input resistor 198 connected between reference line 140 and the non-inverting input of amplifier 192 and a resistive output network including resistors 200 and 201. The output from integrator 20 is taken from a junction 204 between resistors 200 and 201 and together with a biasing current derived from a +15 volt source applied through biasing resistor 206 forms one input to summing junction 22.

Summing junction 22 is provided by an operational amplifier 210, a feedback resistor 212, and an input resistor 214 connected between the inverting input of amplifier 210 and the SP error signal at the output of differential amplifier 16. The integrated SP error signal and above-mentioned bias are applied to the non-inverting side of amplifier 210. The summation of the SP error and the integrated SP error appears at an output junction 216, in which the polarity of the signal, now referred to as the compensated SP error signal, is again inverted so that an increasing, positive magnitude thereof represents an increasing wattage measured by circuit 11.

The compensating effect of integrator 20 is designed to be asymmetrical, depending upon whether the SP error signal represents an overload condition or an underload condition. The bias signal applied through resistor 206 to the non-inverting input of summing amplifier 210, is selected so that an output of +3 volts from integrator 20, when summed with the instantaneous value of the SP error signal applied through resistor 214 of summing amplifier 210, produces an output voltage at junction 216 representing a zero SP error. The output of the integrator can vary from this bias level of +3 volts upwardly to +15 volts to add a strong, positive integral component when there is an SP error representing an overload condition to cause load shedding that results in a substantial undershoot correction. On the other hand, variation of the integrator output below the +3 volt bias level, is limited at approximately 0 volts, so that only a minor integral component correction is available for an SP error representing an underload condition. Inasmuch as there is no penalty in the case of a temporary underload condition this asymmetrical operation is desirable.

Absolute value circuit 32 includes an operational amplifier 220, an input resistor 222 and a non-linear feedback network of a serially connected diode 224 and a resistor 226, wherein the junction 228 between diode 224 and resistor 226 exhibits a nonlinear output in response to the compensated SP error signal applied through input resistor 222. With the non-inverting input of amplifier 220 connected to the +5 volt reference appearing on line 140, the circuit is responsive to any input voltage more positive than +5 volts to cause the output of amplifier 220 at junction 230 to go negative, thereby reverse biasing diode 224, and in effect disconnecting the amplifier 220 and the diode 224 from the circuit. This leaves merely the serial connection of input resistor 222 and feedback resistor 226 between junctions 216 and 228, and since the input impedance to the succeeding circuit stage is substantial, the greater than +5 volt signal at the output of circuit 18, appears in undiminished magnitude at the output of absolute value circuit 32 and in particular at output junction 228 thereof. This is represented in a simplified waveform sketch shown in FIG. 3B adjacent junction 228 as waveform segment 236. On the other hand, if the compensated SP error signal at the input of circuit 32 falls below +5 volts, the inverting input of amplifier 220, relative to the 5 volt reference on line 140, becomes negative, which in turn is inverted to a positive polarity at output junction 230, forward biasing diode 224. With the diode forward biased, amplifier 220 and feedback resistor 226 operate in the well known manner to produce an output signal that is proportional in magnitude to the input signal and has an inverted polarity with respect to the polarity of the input signal as represented by fragment 238. Thus the output signal, in mathematical terms, equals the absolute value of the input signal. The absolute value of the compensated SP error signal is fed from junction 228 over connection 46 to an input of threshold detection circuit 36. The voltage signal at junction 230, directly at the output of amplifier 220, is fed over circuit connection 48 to polarity detection circuit 34.

Threshold detection circuit 36 includes an operational amplifier 240 connected as a voltage follower and having an output junction 242 that is connected in parallel to the inverting input of an operational amplifier 244 and to one end of a variable resistor 246 of VCO 38.

Amplifier 244 of threshold detection circuit 36 is connected as a level comparator in which the amplitude of the signal applied to the inverting input of amplifier 244 is compared with a reference voltage applied at the non-inverting input, where the reference voltage is in this instance equal to 6.5 volts and is developed by a resistive biasing network of resistors 250 and 252 and source voltages of +15 volts and +5 volts, respectively. A positive feedback resistor 254 causes the output of amplifier 244 at junction 256 to exhibit a stepwise swing when the analog voltage signal received from absolute value circuit 32 via follower amplifier 240 rises above the reference level of +6.5 volts (see waveform sketch at output of circuit 32). In this instance the output at junction 256 drops from a relatively high level to a lower voltage level when the threshold is exceeded.

The direction of the error is sensed by circuit 34 in which an NPN transistor 260, biased by resistors 262 and 264, is switched "off" by the voltage at junction 230 of absolute value circuit 32 when the signal at junction 230 exceeds the +5 volt reference on line 140. The voltage at the collector of transistor 260 thereupon swings upwardly toward the +10 volt source applied through resistor 262 and applies a logic high voltage to connection 52, enabling add gate 42 and disabling shed gate 44 through inverter 266. Conversely, transistor 260 is turned on by junction 230 falling below +5 volts, causing the collector of transistor 260 to drop to a logic low voltage and thereby enabling shed gate 44 and disabling add gate 42.

Concurrently with the above-described operation of comparator amplifier 244 of detection circuit 36 and the operation of the transistor 260 of detection circuit 34, the analog output voltage from follower amplifier 240 appearing at junction 242 is applied to VCO 38 for controlling the frequency of a train of pulses generated thereby. For this purpose, VCO 38 includes an operational amplifier 270 and positive and negative feedback networks, the former of which is provided by a resistor 272 and the latter of which is provided by a serially connected resistor 274 and a diode 276. A resistor 271 connects the +5 volt reference on line 140 to the junction of resistor 272 and the non-inverting input of amplifier 270. A network connected to the inverting input of amplifier 270 includes a previously mentioned variable resistance 246, a biasing resistor 278 and a +15 voltage source for providing a bias input signal to VCO 38, and a capacitor 280 connected between ground and the inverting input of amplifier 270. These components connected as shown in FIG. 3b function, as known per se, to oscillate and produce a train of pulses at an output junction 282 that is proportional in frequency to the magnitude of the input signal applied to resistor 246. The frequency of the output pulse train for any given input is also adjustable by means of varying resistor 246, so that for any given level of compensated SP error signal applied to VCO 38, the output pulse frequency can be calibrated.

The principal component of divider 40 is a digital counter 284 that receives clocking pulses produced by VCO 38. After the counter registers a predetermined number of such pulses, in this instance sixty-four, the output 286 of the counter switches from a normal logic low voltage to a logic high voltage and after a suitable delay is reset. This operation produces a high-going pulse at one input of each of gates 42 and 44 via parallel connection 50. A pair of R-C signal delay networks formed by resistor 288 and capacitor 289, and resistor 291 and capacitor 292, respectively, are connected between output 286 of counter 284 for resetting the counter at reset input 293 in response to the high-going signal at output 286. A diode 287, connected between the output junction 256 of comparator amplifier 244 and resistor 288 of one of the delay networks, is forward biased when the compensated SP error signal is below the threshold of amplifier 244 so as to maintain counter 284 in the reset state by conducting a signal to reset input 293 via resistor 288.

As a result of the foregoing, the output pulses of counter 284 are timed by the frequency of the output pulses from VCO 38, which frequency varies in proportion to the magnitude of the compensated SP error signal. Once the threshold add or shed limits have been exceeded as described above, then VCO 38 and divider 40 function to determine the frequency at which add or shed pulses are to be produced.

The values of capacitors 156, 174 and 194 in amplifiers 13 and 16 are selected relative to the values of the resistive components associated therewith, to provide a suitable response time of circuit 7. In particular, capacitors 156 and 174, together with the associated resistors, determine the time response of the SP error signal, and by design, this response time should be somewhat faster than the demand interval over which the utility meter registers total energy consumption. On the other hand, this response cannot be too fast, otherwise undesirable instability will occur in the form of oscillations as well known from established control system theory.

The selection of capacitor 194 and the associated resistances of integrator 20 are such that the integrator applies a load corrective component to the SP error signal without introducing any unwanted instability into the system because of too rapid of changes in the compensated SP error signal.

It is contemplated that the embodiments of the present invention described hereinabove will be used in a load controlling system to maintain the rate of power consumption at a fairly uniform level and to avoid unnecessary utility cost penalties for excessive power consumption during the utility established intervals. However, other applications of the principles of the present invention exist. For example, the load regulating principles can be utilized in the absence of a utility meter, for the purpose of leveling out the power consumption rate to prevent overloading of distribution circuits, or for saving energy.

Also, it will be appreciated that the particular circuitry, disclosed in detail hereinabove, represents only one exemplary embodiment of the principles of the present invention, and numerous changes to the disclosed circuitry can be made without departing from the spirit of the invention. For example, the signal applied to input terminals 128 and 130 in the present embodiment is developed by a circuit 11 that measures true power in response to a three-phase, four-wire electrical installation. It is preferred but not essential that the input signal reflect the true power. For example, the power can be approximated by other well-known wattage measuring systems and circuits, including means for roughly estimating power by measuring current and multiplying the current times a constant based on the nominal line voltage. Furthermore it will be apparent that the electrical installation at which the wattage is measured, need not be a multiphase installation as illustrated in the present disclosure, but can be any of the various commonly used electrical installations including single phase 2 wire, single phase 3-wire, three phase 3-wire, etc.

Thus, the foregoing disclosure is to be considered as illustrative of one practical embodiment of the principles of the present invention.

What is claimed is:

1. A closed loop power monitoring and load control system, comprising the combination of:

analog measuring means for measuring the rate of power delivered to a plurality of electrical loads, said analog measuring means having an output at which an analog signal is produced that has a predetermined relationship to said rate;

reference signal source means for producing a reference signal;

electrical difference taking means responsive to said analog measuring means and to said reference signal source means for producing an analog error signal that represents the difference between said analog signal and said reference signal, said analog error signal having a nominal level when the rate of power delivered to the electrical loads equals a desired rate and deviating from said nominal level in a first direction when such rate of power exceeds the desired rate and deviating from said nominal level in a second direction when such rate of power falls below the desired rate;

analog to digital conversion circuit means including a threshold detector means for detecting when said analog error signal deviates from said nominal level by a predetermined amount in either of said first or second directions;

said analog to digital conversion circuit means further including first and second digital outputs, said first digital output producing a digital shed signal commanding that a load be shed when said threshold detector means detects that said analog error signal has deviated from said nominal level by said predetermined amount in said first direction, and said second digital output producing a digital add signal commanding that a load be added when said threshold detector means detects that said analog error signal has deviated from said nominal level by said predetermined amount in said second direction; and load control circuitry means having an input responsive to said first digital output of said analog to digital conversion circuit means for disconnecting one of a plurality of electrical loads in response to said digital shed signal, and having another input connected to said second digital output of said analog to digital conversion circuit means for connecting one of a plurality of electrical loads in response to said digital add signal.

2. The combination in claim 1, further comprising: an error compensating circuit including a summing circuit means and an integrating circuit means, said error compensating circuit being connected between said electrical difference taking means and said threshold detector means of said analog to digital conversion circuit means, said integrating circuit means receiving said analog error signal and producing a time integral thereof, said summing circuit means summing said time integral of said analog error signal with said analog error signal to produce a compensated analog error signal to which said threshold detector means is responsive.

3. A power monitoring and control signal generating circuit for operating a load control circuitry of the type that responds to a digital shed signal to disconnect one of a plurality of controlled electrical loads from a power source and that responds to a digital add signal to connect one of such plurality of loads to such power source, comprising:

analog measuring means for measuring the rate of power delivered by such power source to such plurality of electrical loads, said analog measuring means having an output at which an analog signal is produced that has a predetermined relationship to said rate of power;

reference signal source means for producing a reference signal;

electrical difference taking means responsive to said analog measuring means and to said reference signal source means for producing an analog error signal that represents the difference between said analog error signal and said reference signal, said analog error signal having a nominal level when the rate of power equals a desired rate of power and deviating from said nominal level in a first direction when the measured rate of power exceeds the desired rate of power and deviating from said nominal level in a second direction when the measured rate of power falls below the desired rate of power;

error compensating circuit means connected to said electrical difference taking means and including a summing circuit means and an integrating circuit means, said integrating circuit means receiving said analog error signal and producing a time integral thereof, said summing circuit means summing said time integral of said analog error signal with said analog error signal to produce a compensated analog error signal;

analog to digital conversion circuit means including a threshold detector means for detecting when said compensated analog error signal deviates from said nominal level by a predetermined amount in either of said first or second directions; and said analog to digital conversion circuit means further including first and second digital outputs, said first digital output producing a digital shed signal when said threshold detector means detects that said compensated analog error signal has deviated from said nominal level by said predetermined amount in said first direction, and said second digital output producing a digital add signal when said threshold detector means detects deviation of said compensated analog error signal from said nominal level by said predetermined amount in said second direction.

4. The power monitoring and control signal generating circuit of claim 3, wherein said analog measuring means includes adjustable gain means for adjustably setting a predetermined relationship between said analog signal at the output of said analog measuring means and said rate of power measured by said analog measuring means, and wherein said reference signal produced by said reference signal source means is fixed such that said adjustable gain means of said analog measuring means can be adjustably set to cause said analog error signal to assume said nominal level when the rate of power equals the desired rate of power.

5. The power monitoring and control signal generating circuit of claim 3, wherein said analog to digital conversion circuit means further includes a first means for generating a succession of digital pulse signals when said threshold detector means detects that said compensated analog error signal has deviated from said nominal level by said predetermined amount in either said first or second directions, shed gate means having an input connected to receive said succession of pulse signals from said first means and having an output providing said first digital output, add gate means having its input connected to receive said succession of pulse signals from said first means and having an output providing said second digital output, and second means for enabling said shed gate means to pass said succession of pulse signals to said first digital output when said compensated analog error signal deviates from said nominal level in said first direction and for enabling said add gate means for passing said succession of pulse signals to said second digital output when said compensated analog error signal deviates from said nominal level in said second direction.

6. The power monitoring and control signal generating circuit of claim 5, wherein said first means includes means for causing the frequency of said succession of digital pulse signals to increase with increasing deviation of said compensated analog error signal by amounts greater than said predetermined amount.

7. The power monitoring and control signal generating circuit of claim 5, wherein said threshold detector means includes absolute value taking circuit means that is responsive to said compensated analog error signal to produce a signal of predetermined polarity that has a magnitude proportional to the amount by which said compensated analog error signal deviates from said nominal level irrespective of the direction of such deviation, and circuit means for detecting a predetermined threshold level of said magnitude of such signal.

8. In a method of controlling the on and off states of a plurality of electrical loads in a closed loop control system, the combination of steps comprising:
measuring the rate that electrical power is delivered to said plurality of loads;
producing an electrical analog signal in response to said step of measuring, wherein said electrical analog signal is representative of said rate;
producing an electrical reference signal;
electrically taking the difference between said electrical analog signal and said electrical reference signal to produce an analog error signal, said analog error signal having a predetermined nominal level when the measured rate equals a desired rate and deviating from said nominal level in a first direction when the measured rate exceeds said desired rate and deviating from said nominal level in a second direction when said measured rate falls below said desired rate; and
converting said analog error signal into a first digital output signal when said analog error signal deviates from said nominal level in said first direction by a predetermined threshold amount, and converting said analog error signal to a second digital output signal when said analog error signal deviates from said nominal level by a predetermined threshold amount in said second direction, whereby said first digital output signal is used to turn on one of said electrical loads and said second digital output signal is used to turn off one of said electrical loads.

9. In the method of claim 8, the combination of steps further comprising:
compensating said analog error signal after it is produced by the step of said electrically taking the difference and before the step of said converting, the step of compensating said analog error signal comprising the substeps of integrating said analog error signal as a function of time to produce a time integrated analog error signal, and summing said time integrated analog error signal with said analog error signal to produce a compensated analog error signal, and wherein the step of said converting is performed on said compensated analog error signal so as to produce first and second digital output signals that regulate the on and off states of the plurality of electrical loads so as to compensate for certain temporary overload and underload conditions respectively.

* * * * *